(12) United States Patent
Ruan et al.

(10) Patent No.: US 10,101,969 B1
(45) Date of Patent: Oct. 16, 2018

(54) MONTGOMERY MULTIPLICATION DEVICES

(71) Applicant: Xilinx, Inc., San Jose, CA (US)

(72) Inventors: Ming Ruan, Shanghai (CN); Fengshou Guo, Shanghai (CN)

(73) Assignee: XILINX, INC., San Jose, CA (US)

( * ) Notice: Subject to any disclaimer, the term of this patent is extended or adjusted under 35 U.S.C. 154(b) by 86 days.

(21) Appl. No.: 15/076,345

(22) Filed: Mar. 21, 2016

(51) Int. Cl.
*G06F 7/72* (2006.01)

(52) U.S. Cl.
CPC .............. *G06F 7/728* (2013.01); *G06F 7/722* (2013.01)

(58) Field of Classification Search
CPC .................................. G06F 7/722; G06F 7/728
See application file for complete search history.

(56) References Cited

U.S. PATENT DOCUMENTS

| | | | |
|---|---|---|---|
| 5,101,431 A | 3/1992 | Even | |
| 5,321,752 A * | 6/1994 | Iwamura | G06F 7/722 380/28 |
| 6,963,977 B2 * | 11/2005 | Chen | G06F 7/723 380/255 |
| 7,046,800 B1 * | 5/2006 | Tenca | G06F 7/728 380/28 |
| 7,174,015 B1 * | 2/2007 | Koc | G06F 7/728 380/28 |
| 7,552,377 B1 | 6/2009 | Jones | |
| 2004/0267855 A1 * | 12/2004 | Shantz | G06F 7/5324 708/523 |
| 2007/0233769 A1 | 10/2007 | Moshier et al. | |
| 2008/0195848 A1 * | 8/2008 | Fayad | G06F 7/722 712/221 |

OTHER PUBLICATIONS

Perin, Guilherme et al., "Montgomery Modular Multiplication on Reconfigurable Hardware: Fully Systolic Array vs Parallel Implementation," Proc. of the 2010 VI Southern Programmable Logic Conference, Mar. 24, 2010, pp. 61-66, IEEE, Piscataway, New Jersey, USA.

Tenca, Alexandre F. et al., "A Scalable Architecture for Montgomery Multiplication," Proc. of the First International Workshop on Cryptographic Hardware & Embedded Systems, Aug. 12, 1999, Springer-Verlag, London, U.K.

* cited by examiner

*Primary Examiner* — Chuong D Ngo
(74) *Attorney, Agent, or Firm* — David O'Brien; Robert M. Brush (57) ABSTRACT

A system includes an integrated circuit configured to receive a multiplicand number, a multiplier number, and a modulus at one or more data inputs. The multiplicand number is partitioned into a plurality of multiplicand words. Each multiplicand word has a multiplicand word width. The multiplier number is partitioned into a plurality of multiplier words. Each multiplier word has a multiplier word width different from the multiplicand word width. A plurality of outer loop iterations of an outer loop is performed to iterate through the plurality of the multiplicand words. Each outer loop iteration of the outer loop includes a plurality of inner loop iterations of an inner loop performed to iterate through the plurality of the multiplier words. A Montgomery product of the multiplicand number and the multiplier number with respect to the modulus is determined.

20 Claims, 9 Drawing Sheets

FIG. 1

Algorithm 200: Multiple-Word Montgomery Multiplication

Input: integers X, Y, M, w1, w2, R1, and R2, where
w1<=w2; R1 = $2^{w1}$; R2 = $2^{w2}$;
$X = \sum_{i=0}^{Lx-1} x[i] \, (R1)^i$;
$Y = \sum_{j=0}^{Ly-1} y[j] \, (R2)^j$;
$M = \sum_{j=0}^{Ly-1} m[j] \, (R2)^j$;

Output: S = X * Y * R1$^{-Lx}$ mod M.

1. s[0] = 0
2. m', where (m' * m[0]) mod R1 = -1
3. for i = 0 to $L_x$-1
    3.1. z1 = x[i] * y[0] + s[0];
    3.2. q[i] = (z1 * m') mod $2^{w1}$
    3.3. z2 = z1 + q[i] * m[0];
    3.4. r = (z2 mod $2^{w1}$) >> w1
    3.5. c = z2 >> w2;
    3.6. for j = 1 to $L_y$-1
        3.6.1. z1 = x[i] * y[j] + s[j];
        3.6.2. z2 = z1 + q[i] * m[j] + c;
        3.6.3. s[j-1] = ((z2 mod $2^{w1}$) << (w2 – w1)) | r;
        3.6.4. r = (z2 mod $2^{w2}$) >> w1;
        3.6.5. c = z2 >> w2;
    3.7. end
    3.8. z = s[$L_y$] + c;
    3.9. s[$L_y$-1] = ((z mod $2^{w1}$) << (w2 - w1)) | r;
    3.10. s[$L_y$] = z >> w1;
4. end

MONTGOMERY MULTIPLICATION DEVICES

TECHNICAL FIELD

Examples of the present disclosure generally relate to integrated circuits ("ICs") and, in particular, to an embodiment related to ICs performing residual modular multiplication including Montgomery multiplication.

BACKGROUND

Montgomery multiplication is one of the fundamental operations used in cryptographic algorithms, such as RSA and Elliptic Curve Cryptosystems. The security of a cryptographic system which is based on the multiplication and subsequent factoring of large numbers is related to the size of the numbers employed, for example, the number of bits or digits in the number. However, while it is desirable to include a large number of bits in each of the operands, the speed of Montgomery multiplication of these numbers becomes significantly slower as the number of bits increases.

Accordingly, it would be desirable and useful to provide an improved way of implementing Montgomery multiplication.

SUMMARY

In some embodiments in accordance with the present disclosure, a system includes an integrated circuit configured to receive a multiplicand number, a multiplier number, and a modulus at one or more data inputs; partition the multiplicand number into a plurality of multiplicand words, where each multiplicand word has a multiplicand word width; partition the multiplier number into a plurality of multiplier words, where each multiplier word has a multiplier word width different from the multiplicand word width; perform a plurality of outer loop iterations of an outer loop to iterate through the plurality of the multiplicand words, where each outer loop iteration of the outer loop includes a plurality of inner loop iterations of an inner loop performed to iterate through the plurality of the multiplier words; and determine a Montgomery product of the multiplicand number and the multiplier number with respect to the modulus.

In some embodiments, the integrated circuit is configured to partition the modulus into a plurality of modulus words, where each modulus word has the multiplier word width; and iterate through the plurality of modulus words using the plurality of inner loop iterations of the inner loop.

In some embodiments, the integrated circuit is configured to provide multiplication operations using one or more N1 bit by N2 bit multipliers, where N1 and N2 are different integers; and determine the multiplicand word width and the multiplier word width based on N1 and N2.

In some embodiments, the integrated circuit is configured to provide N1 as the multiplicand word width, and provide N2 as the multiplier word width, where N1 is less than N2.

In some embodiments, the integrated circuit is configured to compute a quotient for each outer loop iteration of the outer loop using a quotient processing element ("PE"); provide the quotient to at least one of a plurality of tailing PEs; and perform inner loop iterations of the inner loop using the plurality of tailing PEs.

In some embodiments, each tailing PE includes one of the one or more N1 bit by N2 bit multipliers.

In some embodiments, the integrated circuit is configured to divide the plurality of multiplier words into a plurality of multiplier word groups, wherein each multiplier word group includes a same number of multiplier words; and provide a multiplier word group to each tailing PE.

In some embodiments, the integrated circuit is configured to perform a portion of the inner loop iterations by a tailing PE to iterate through the multiplier words of the multiplier word group provided to the tailing PE.

In some embodiments, the integrated circuit is configured to perform a multiplication operation of a first inner loop iteration of an inner loop using the multiplier of a tailing PE, during a first clock cycle. A multiplication operation of a second inner loop iteration of the inner loop is performed using the multiplier of the tailing PE during a second clock cycle next to the first clock cycle.

In some embodiments, the integrated circuit is configured to perform a multiplication operation of an inner loop iteration of a first inner loop using the multiplier of a tailing PE during a first clock cycle. A multiplication operation of an inner loop iteration of a second inner loop is performed by the multiplier of the tailing PE during a second clock cycle next to the first clock cycle.

In some embodiments in accordance with the present disclosure, a method includes receiving, by an integrated circuit, a multiplicand number, a multiplier number, and a modulus at one or more data inputs; partitioning the multiplicand number into a plurality of multiplicand words, wherein each multiplicand word has a multiplicand word width; partitioning the multiplier number into a plurality of multiplier words, wherein each multiplier word has a multiplier word width different from the multiplicand word width; performing a plurality of outer loop iterations of an outer loop to iterate through the plurality of the multiplicand words, wherein the performing each outer loop iteration of the outer loop includes performing a plurality of inner loop iterations of an inner loop to iterate through the plurality of the multiplier words; and determining a Montgomery product of the multiplicand number and the multiplier number with respect to the modulus.

In some embodiments, the method further includes partitioning the modulus into a plurality of modulus words, wherein each modulus word has the multiplier word width; wherein the performing the plurality of inner loop iterations of the inner loop includes iterating through the plurality of modulus words.

In some embodiments, the method further includes providing multiplication operations using one or more N1 bit by N2 bit multipliers, wherein N1 and N2 are different integers; and determining the multiplicand word width and the multiplier word width based on N1 and N2.

In some embodiments, the determining the multiplicand word width and the multiplier word width based on N1 and N2 includes providing N1 as the multiplicand word width and providing N2 as the multiplier word width, wherein N1 is less than N2.

In some embodiments, the method further includes computing a quotient for each outer loop iteration of the outer loop using a quotient processing element ("PE"); providing the quotient to at least one of a plurality of tailing PEs; and performing inner loop iterations of the inner loop using the plurality of tailing PEs.

In some embodiments, the method further includes dividing the plurality of multiplier words into a plurality of multiplier word groups, wherein each multiplier word group includes a same number of multiplier words; and providing a multiplier word group to each tailing PE.

In some embodiments, the performing the inner loop iterations of the inner loop using the plurality of tailing PEs includes performing, by each tailing PE, a portion of the inner loop iterations to iterate through the multiplier words of the provided multiplier word group.

In some embodiments, the method further includes performing, by the multiplier of a tailing PE, a multiplication operation of a first inner loop iteration of an inner loop during a first clock cycle; and performing, by the multiplier of the tailing PE, a multiplication operation of a second inner loop iteration of the inner loop during a second clock cycle next to the first clock cycle.

In some embodiments, the method further includes performing, by the multiplier of a tailing PE, a multiplication operation of an inner loop iteration of a first inner loop during a first clock cycle; and performing, by the multiplier of a tailing PE, a multiplication operation of an inner loop iteration of a second inner loop during a second clock cycle next to the first clock cycle.

Other aspects and features will be evident from reading the following detailed description and accompanying drawings.

BRIEF DESCRIPTION OF THE DRAWINGS

FIG. 7 is a timing diagram of an exemplary Montgomery multiplication device or a portion thereof according to some embodiments of the present disclosure.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. As demands for speed increase, Montgomery multiplication operations in the form of configurable (or programmable) hard macros in system on chip ("SoC"), field programmable gate array ("FPGA"), or other ICs likewise increases. For example, a plurality of digital signal processing ("DSP") slices including multiply adders (also referred to as multiplier-accumulators or MACs) may be used to implement Montgomery multiplication. The MAC may include N1-bit by N2-bit multipliers. In such implementations, N1 and N2 may not be the same, and the most significant bits of the N1-bit by N2-bit multipliers may not be utilized. Furthermore, in some solutions, idle clock cycles in the MAC may limit the efficiency of the operation.

As described below in additional detail, in some embodiments, the operands of the Montgomery multiplication (e.g., the multiplicand, multiplier and modulus) may be partitioned into words having different word widths to utilize the full calculation capability of the MAC. In some examples, the different word widths may be determined based on the input precision of the multipliers. Furthermore, the computations for the multiple words of the operands may be pipelined such that idle clock cycles in the MAC are reduced or eliminated. Moreover, Montgomery multiplication units may be configured to operate in multiple modes to support operands having different widths.

With the above general understanding borne in mind, various embodiments for Montgomery multiplication are generally described below. While the description below is directed at particular examples implemented with configurable (or programmable) hard macros, other applications (e.g., with software implementations) where Montgomery multiplication may be required may benefit from the present disclosure as described herein.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
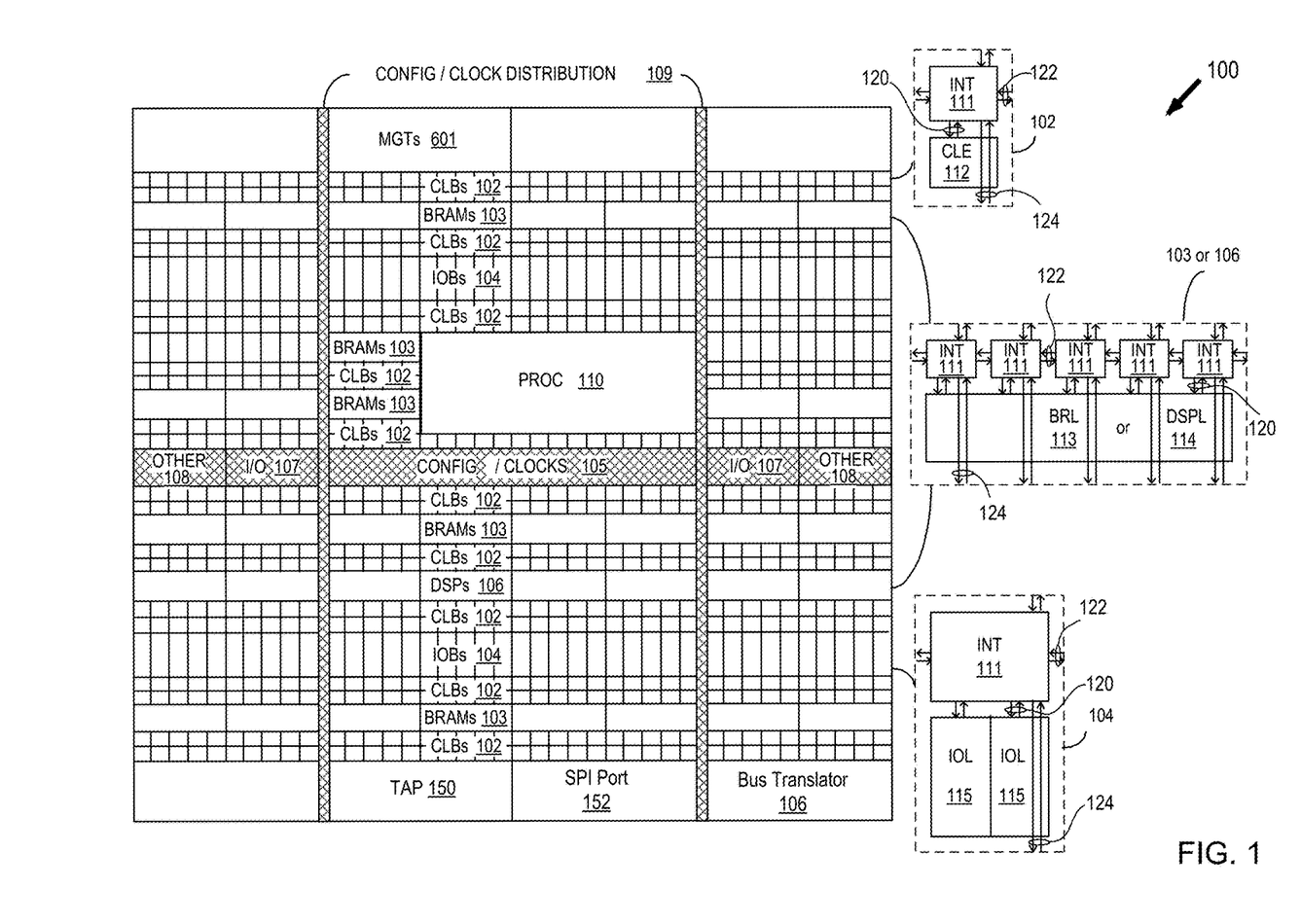
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

It is noted that the IC that may implement the Montgomery multiplication is not limited to the exemplary IC depicted in FIG. 1, and that IC having other configurations, or other types of IC, may also implement the Montgomery multiplication.

Figure 2:
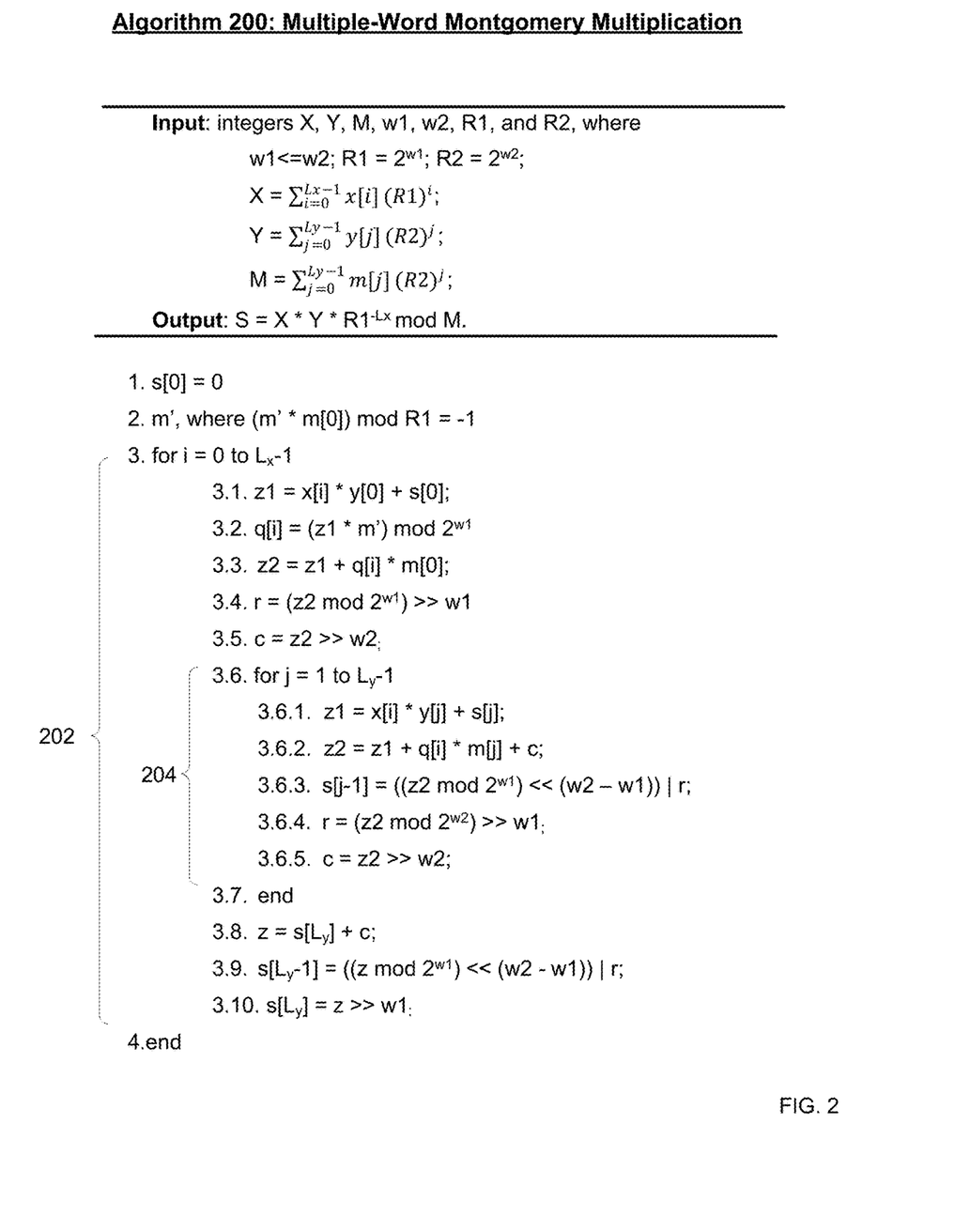
FIG. 2 is a pseudo code for a Montgomery multiplication operation according to some embodiments of the present disclosure.

Referring to FIG. 2, illustrated is a pseudo code for an algorithm 200 to perform multiple-word Montgomery multiplication according to some embodiments. As illustrated in FIG. 2, the process of the algorithm 200 may receive inputs including a first operand X (also referred to as the multiplicand number X), a second operand Y (also referred to as the multiplier number Y), a modulus M, a first word width w1 (also referred to as the multiplicand word width w1), and a second word width w2 (also referred to as the multiplier word width w2). In some embodiments, w1 is equal to w2. In some embodiments, w1 is less than w2. The process may also receive integers R1 and R2, where R1 is equal to $2^{w1}$ and R2 is equal to $2^{w2}$. The process of the algorithm 200 may provide an output S for the Montgomery multiplication which is equal to $X*Y*R1^{-Lx} \mod M$.

In some embodiments, the first operand X, the second operand Y, and the modulus M are partitioned into multiple words. Specifically, the first operand X is partitioned into $L_x$ words, and each word x[i] of the $L_x$ words has w1 bits, where $L_x$ is an integer, and i is an integer between 0 and $L_x-1$. The second operand Y is partitioned into $L_y$ words, and each word y[j] of the $L_y$ words has w2 bits, where $L_y$ is an integer and j is an integer between 0 and $L_y-1$. The modulus M is partitioned into $L_y$ words, and each word m[j] of the $L_y$ words has w2 bits. For X, Y, and M having particular widths, by increasing the word widths w1 and w2, $L_x$ and $L_y$ may decrease. The first operand X, the second operand Y, and the modulus M may be expressed as follows:

$$X = \Sigma_{i=0}^{Lx-1} x[i](R1)^i;$$

$$Y = \Sigma_{j=0}^{Ly-1} y[j](R2)^j; \text{ and}$$

$$M = \Sigma_{j=0}^{Ly-1} m[j](R2)^j.$$

In some embodiments, the algorithm 200 scans through $x[0:L_x-1]$ in an outer loop 202 (also referred to as the main loop 202), which corresponds to lines 3 to 4 of the algorithm 200. During an outer loop iteration of the outer loop 202 processing x[i], after processing y[0] and m[0], the algorithm 200 scans through $y[1:L_y-1]$ and $m[1:L_y-1]$ in an inner loop 204, which corresponds to lines 3.6 to 3.7 of the algorithm 200. During an inner loop iteration processing y[j] and m[j], a result s[j−1] is calculated using x[i], y[j], m[j], and s[j], where s[j] is calculated during the last outer loop iteration processing x[i−1]. After the algorithm 200 finishes processing x[Lx−1] of the outer loop 202, the output S may be computed as follows:

$$S = \Sigma_{j=0}^{Ly} s[j](R2)^j.$$

As illustrated in that formula, in some embodiments, there is a need to expand S by one bit (e.g., where M is greater than $\frac{1}{2}*(R2)^{Ly}$). As such, S may be represented by $L_y+1$ words including s[0] to $s[L_y]$.

In some embodiments, in the algorithm 200, each of the x[i], m', and q[i] has a width of w1 bits, and each of the y[j], s[j], and m[j] has a width of w2 bits. The first word width w1 and the second word width w2 may be the same, or may be different from each other. In some examples, the first word width w1 and the second word width w2 may be determined based on the precision of the multipliers used to implement the algorithm 200 to fully utilize the calculation capability of the multipliers, which is discussed in detail below.

Figure 3A:
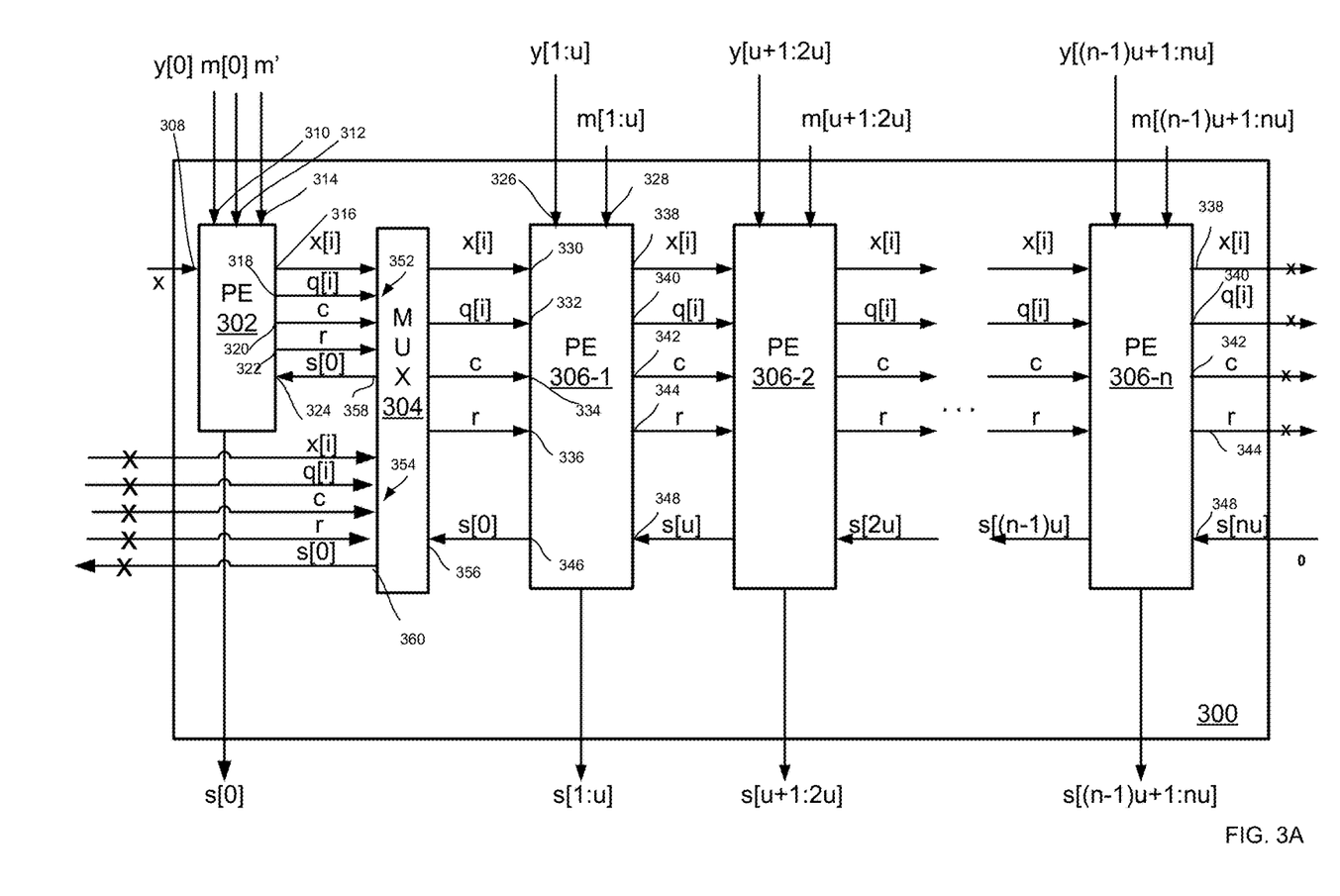
FIG. 3A is a block diagram illustrating an exemplary Montgomery multiplication device or a portion thereof according to some embodiments of the present disclosure.

Referring to FIG. 3A, illustrated is an example of an integrated circuit (IC) for performing Montgomery multiplication using the algorithm 200. A Montgomery multiplication device 300 may include n+1 processing elements ("PE"), which are interconnected in sequence. The first PE is a PE 302, followed by PE 306-1, PE 306-2, . . . and PE 306-n, where n is an integer (e.g., n=10). In some embodiments, the device 300 includes a multiplexer (MUX) 304 which sends data between the PE 302 and the PE 306-1. Alternatively, in some embodiments, the MUX 304 is omitted, where the outputs of the PE 302 are directly provided to the inputs of the PE 306-1, and the outputs of the PE 306-1 is provide directly to the inputs of the PE 302.

In some embodiments, the PE 302 may have a structure that is different from PE 306-1, PE 306-2, . . . , PE 306-n. The PE 302 may be used to compute a quotient (e.g., q[i] according to line 3.2 of the algorithm 200), and may be referred to as a quotient PE. The PE 302 may include an X operand input 308, a Y operand input 310, a modulus input 312, an m' input 314, and an input 324. The X operand input 308 may receive words $x[0:L_x-1]$ (e.g., from a memory element or a control unit in serial) of the operand X. The Y operand input 310 may receive the first word y[0] (e.g., from a memory element or a control unit) of the operand Y. The modulus input 310 may receive the first word m[0] of the modulus M. The m' input 314 may receive an integer m', where (m'*m[0]) mod R1=−1. The input 324 may receive a value s[0] (e.g., from the PE 306-1 (e.g., directly or through a MUX 304) of the device 300.

In some embodiments, the PE 302 includes outputs 316, 318, 320, and 322. During an outer loop iteration processing x[i], the output 316 may output x[i], the output 318 may output q[i], the output 320 may output a carry c, and the output 322 may output a remainder r. These outputs may be sent to the inputs of the PE 306-1 (e.g., directly or using a MUX 304).

In some embodiments, the device 300 includes PEs 306-1, 306-2, . . . 306-n connected in sequence to form a chain following the quotient PE 302. These PEs 306-1, 306-2, . . . 306-n may have substantially the same structure, and each of them may be referred to as a PE 306 or a tailing PE 306. The $k^{th}$ PE 306-k in the chain, where k is an integer between 1 and n, may have inputs 326, 328, 330, 332, 334, 336, and 348. The input 326 may receive u words y[(k−1)u+1:ku] of the operand Y, where u is an integer equal to or greater than one (e.g., u=8). The input 328 of the PE 306-k may receive u words m[(k−1)u+1:ku] of the modulus M. During the outer loop iteration processing x[i], the input 330 may receive x[i], the input 332 may receive q[i], the input 334 may receive a carry c, and the input 336 may receive a remainder r. The inputs 330, 332, 334, and 336 may receive these values from a preceding PE 306 (e.g., from the k−$1^{th}$ PE 306-(k−1), where k>1), or from the PE 302 or the MUX 304 (e.g., where k=1). The input 348 may receive a value s[ku] from a subsequent PE 306 (e.g., the k+$1^{th}$ PE 306-(k+1)). For the last PE 306 in the chain (e.g., PE 306-n), the input 348 may receive 0 for s[ku].

In some embodiments, the number u, together with the second word size w2 and the number n may affect the size of the operand Y that the device 300 may support. In some examples, where a device 300 includes a PE 302 and n PEs 306, and each of the PE 302 and PEs 306 handles u words of the operand Y, the number $L_y$ of words of the operand Y is equal to or less than n*u+1. In those examples, the device 300 may support an operand Y having a width of w2*n*u bits. In an example where w2=26, u=8, and n=10, the device 300 may support an operand Y having a width of 2080 bits.

In some embodiments, the $k^{th}$ PE 306-k in the chain has outputs 338, 340, 342, and 344. During the outer loop iteration processing x[i], the output 338 may output x[i], the output 340 may output q[i], the output 340 may output a carry c, and the output 344 may output a remainder r. These outputs may be provided to the corresponding inputs of the subsequent k+$1^{th}$ PE 306-(k+1) in the chain. In some embodiments, the $k^{th}$ PE 306-k in the chain has an output 346, which may output s[(k−1)u] and send the output s[(k−1)u] to a preceding PE 306 (e.g., to the k−$1^{th}$ PE 306-(k−1) if k>1), or the PE 302 or MUX 304 where k=1.

In some embodiments, the device 300 may also include a multiplexer (MUX) 304 disposed between the PE 302 and the PE 306-1. The MUX 304 has a first set of inputs 352 receiving values provided by the PE 302 of the device 300, and a second set of inputs 354 receiving values from an external device. The MUX 304 may select (e.g., based on an operating mode of the device 300) which set of the inputs may be selected and sent to the PE 306-1. For example, as illustrated in the example of FIG. 3A, while operating in a stand-alone mode, the MUX 304 selects the values received at the first set of inputs 352, and provides the received values to the PE 306-1. The operating mode of the device 300 may be a stand-alone mode or a cascaded mode, which may be configured by a register in run-time.

In some embodiments, the MUX 304 has an input 356 receiving s[0] from the PE 306-1. The MUX 304 may select one of the output 358 connecting to the PE 302 and the output 360 connecting to an external device (e.g., based on an operating mode of the device 300), and send the received s[0] to the selected output. For example, as illustrated in the example of FIG. 3A, while operating in a stand-alone mode, the MUX 304 may send the received s[0] to the PE 302 through the output 358.

In some embodiments, as illustrated in the example of FIG. 3A, while operating in a stand-alone mode, the input 348 of the last PE 306-n receives a value of zero, and the outputs 338, 340, 342, and 344 of the last PE 306-n are not connected to external elements. Further, while operating in a stand-alone mode, the second set of inputs 354 and the output 360 of the MUX are not connected to external elements.

Alternatively, in some embodiments, the MUX 304 is omitted. In such embodiments, the outputs of the PE 302 (e.g., outputs 316, 318, 320, and 322) are directly provided to the corresponding inputs of the PE 306-1, and the output 346 of the PE 306-1 sends the value s[0] directly to the input 324 of the PE 302.

In some embodiments, after the outer loop 202 of the algorithm 200 finishes the outer loop iteration processing the last word $x[L_x-1]$ of the operand X, each of the PE 302 and PE 306 of the device 300 may provide the corresponding words s[j] of the output S, which is the result of the Montgomery multiplication. For example, the PE 302 may provide s[0] of the output S, and the PE 306-k may provide s[(k−1)u+1:ku] of the output S.

Figure 3B:
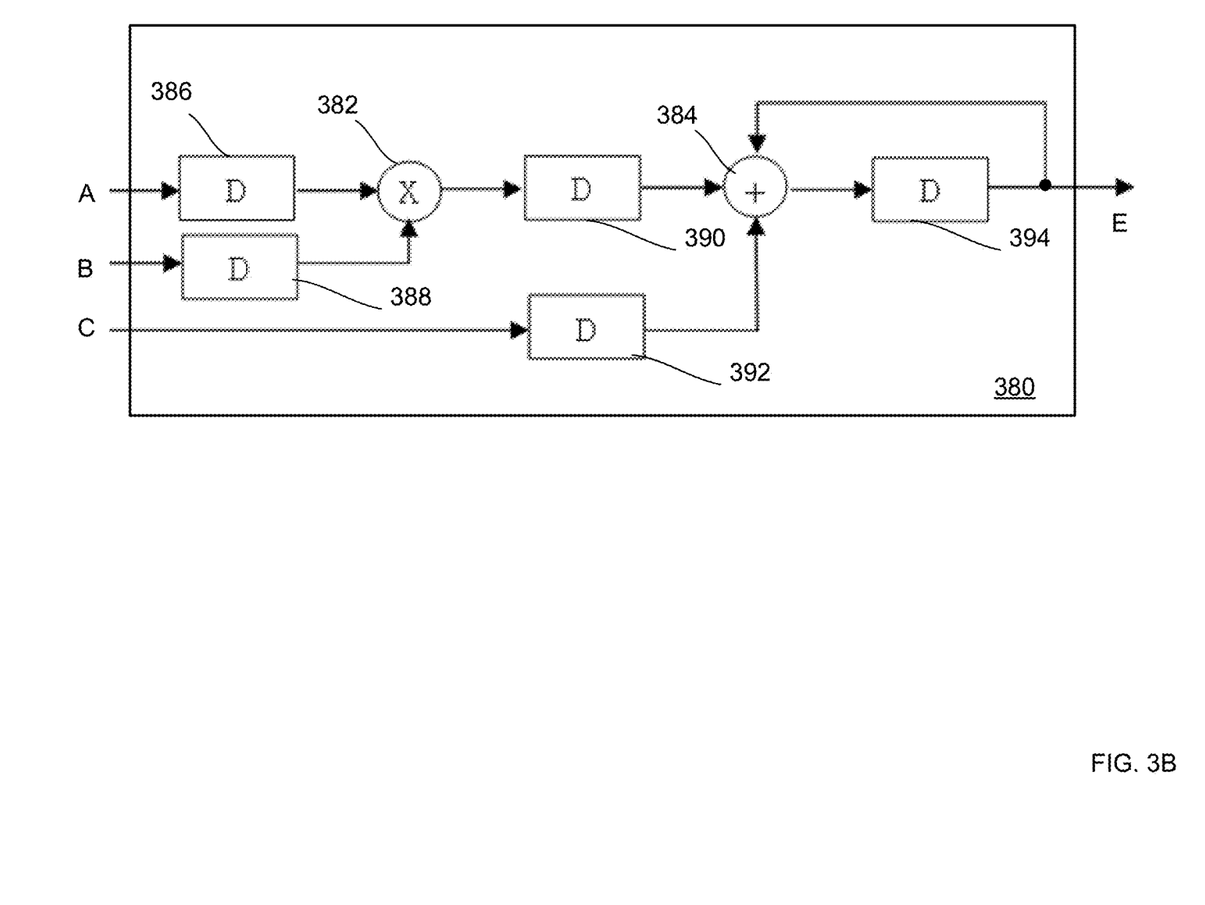
FIG. 3B is a block diagram illustrating an exemplary registered multiply adder according to some embodiments of the present disclosure.

Referring to FIG. 3B, in various embodiments, the PE 302 and the PE 306 may be build using a MAC 380. As illustrated in FIG. 3B, a MAC 380 may include an N1-bit× N2-bit multiplier 382 and an adder 384. The integers N1 and N2 may be the same (e.g., N1=N2=17) or different from each other (e.g., N1=17 and N2=26). A register 386 is configured to receive a first input (e.g., an integer A having a width of N1 bits), and provide the first input to an input of the multiplier 382. A register 388 is configured to receive a second input (e.g., an integer B having a width of N2 bits), and provide the second input to another input of the multiplier 382. The multiplier 382 computes the product of two numbers received at its inputs, and provides the product to a register 390. The register 390 sends the received product to an input of the adder 384. The adder 384 receives a third number (e.g., an integer C) from a register 392, adds the product and the third number, and provide the result to a register 394, which provides the result (e.g., A*B+C) to an output E of the MAC 380. In some embodiments, the register 394 also sends the result received from the adder 384 to another input of the adder 384, which may be used to calculate a result by the adder 384 in another clock cycle. In various embodiments, while inserting the registers in the MAC 380 may cause a longer latency, it may improve the highest clock speed of the MAC 380.

Figure 4:
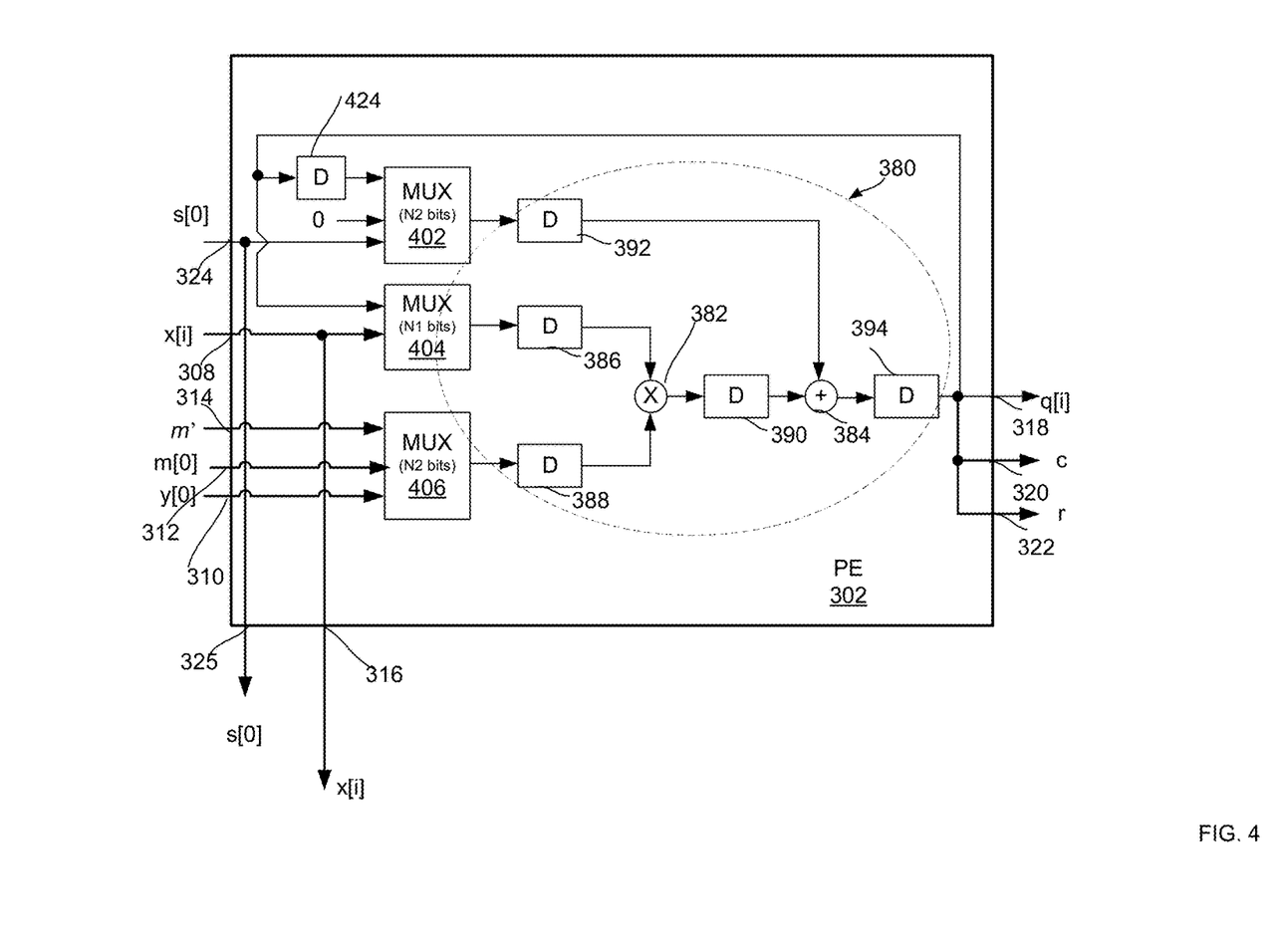
FIG. 4 is a block diagram illustrating an exemplary processing element according to some embodiments of the present disclosure.

Referring to FIG. 4, illustrated therein is an example of the internal structure of the PE 302. In some embodiments, the PE 302 communicates with a control unit of the device 300, serially receives the words of $x[0:L_x-1]$, and starts the pipeline mode of the device 300. The PE 302 includes a MAC 380, which includes a N1-bit by N2-bit multiplier 382. In some embodiments, the first word width w1 is chosen to be equal to N1, and the second word width w2 is chosen to be equal to N2. Referring to FIGS. 1 and 4, in some embodiments, during each outer loop iteration of the outer loop 202 of the algorithm 200, the process performed by the PE 302 may include four paths. The first path corresponds to line 3.1 of the algorithm 200. The second path corresponds to line 3.2 of the algorithm 200. The third path corresponds to line 3.3 of the algorithm 200. The fourth path corresponds to lines 3.4 to 3.5 of the algorithm 200. These paths may at least partially overlap in time. In other words, in some embodiments, at least a portion of the operations in different paths may be performed in parallel.

In some embodiments, in the first path, the MUX 402 selects s[0] and provides s[0] to a register 392 of a MAC 380. The MUX 404 selects x[i] and provides x[i] to a register 388 of a MAC 380. The MUX 406 selects y[0] and provides y[0] to a register 388 of a MAC 380. The MAC 380 computes z1 where z1=x[i]*y[0]+s[0], and the result z1 is sent to a register 394 of the MAC 380, which provides z1 to the MUX 402. The register 394 also provides the lower w1 bits of z1 (e.g., z1 mod $2^{w1}$) to the MUX 404.

In some embodiments, in the second path, the MUX 402 selects 0 from the register 424 and provides 0 to the register 392 of the MAC 380. The MUX 404 selects the lower w1 bits of z1 and sends it to the register 386 of the MAC 380. The MUX 406 selects m' and outputs m' to a register 388 of the MAC 380. The MAC 380 computes q[i], where q[i]= (z1*m') mod $2^{w1}$. The register 394 of the MAC 380 then provides q[i] to the MUX 404 and to the output 318.

In some embodiments, in the third path, the MUX 402 selects z1 from the register 424, and provides z1 to the register 392 of the MAC 380. The MUX 404 selects q[i] and provides q[i] to the register 386 of the MAC 380. The MUX 406 selects m[0] and provides m[0] to the register 388 of the Mac 380. The MAC 380 computes z2, where z2=z1+q[i]*m[0], and the result z2 is sent to the register 394 of the MAC 380.

In some embodiments, in the fourth path, the $w1^{th}$ to $w2^{th}$ bits of the number z2 are extracted as the remainder r, which is provided at the output 322 of the PE 302. The higher w2 bits of the result z2 are provided as the carrier c at the output 320 of the PE 302. In some embodiments, q[i], c, and r are time multiplexed on a single data bus.

Figure 5:
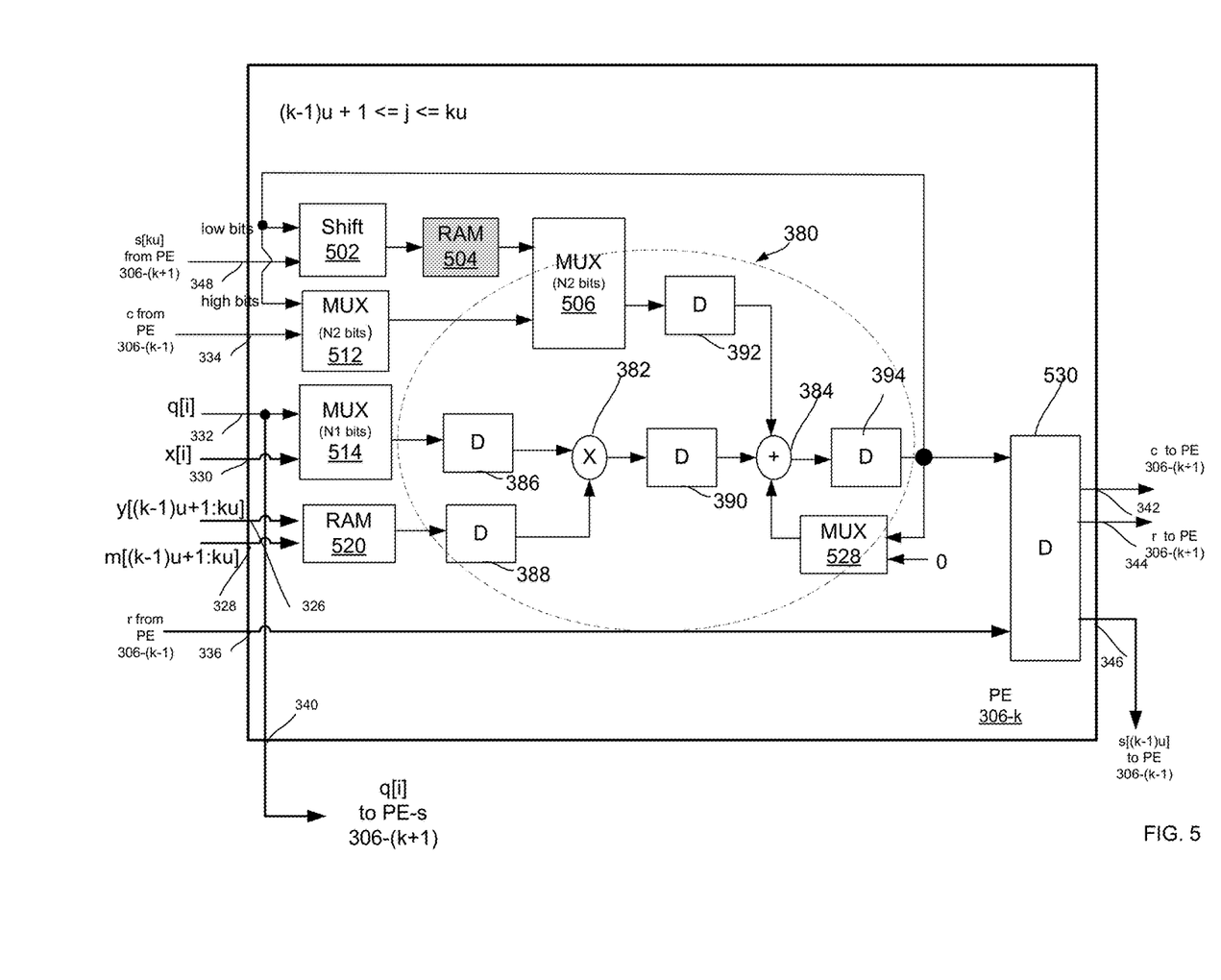
FIG. 5 is a block diagram illustrating an exemplary processing element according to some embodiments of the present disclosure.

Referring to FIG. 5, illustrated therein is an example of the internal structure of the PE 306-k. The PE 306-k includes a MAC 380, which includes a N1-bit by N2-bit multiplier 382. In some embodiments, the first word width w1 is selected to be equal to N1, and the second word width w2 is chosen to be equal to N2. In some embodiments, during initialization, the RAM 520 of the PE 306-k stores y[(k−1) u+1:ku] of the operand Y received at the input 326, and stores m[(k−1)u+1:ku] at the input 328 and stores m[(k−1) u+1:ku] of the modulus M received at the input 328.

In some embodiments, during the outer loop iteration processing x[i−1], the RAM 504 may store s[ku] received at the input 348 (e.g., through the shift 502) from the next PE (e.g., from PE 306-(k+1)). During the outer loop iteration processing x[i−1], the RAM 504 may also store s[(k−1)u+ 1:ku−1] computed by the PE 306-k itself (e.g., sent by the register 394 to the shift 502, and then to the RAM 504). In some embodiments, during the outer loop iteration processing x[i], the PE 306-k receives x[i], q[i], c, and r at inputs 330, 332, 334, and 336 respectively.

Referring to FIGS. 1 and 5, in some embodiments, for each j between (k−1)u+1:ku, during the inner loop iteration processing y[j] and m[j], the process performed by the PE 306-k may include three paths. The first path corresponds to line 3.6.1 of the algorithm 200. The second path corresponds to line 3.6.2 of the algorithm 200. The third path corresponds to lines 3.6.3 to 3.6.5 of the algorithm 200. These paths may at least partially overlap in time. In other words, in some embodiments, some operations in different paths may be performed in parallel.

In some embodiments, at the first path, the RAM 504 provides s[j] computed during the $i-1^{th}$ iteration of the outer loop 202 to the MUX 506. The MUX 506 selects s[j] and sends s[j] to a register 392 of the MAC 380. The MUX 514 selects x[i] and sends x[i] to a register 386 of the MAC 380. The RAM 520 provides y[j] to the register 388 of the MAC 380. The MUX 528 selects 0 and provides 0 to the adder 384 of the MAC 380. The MAC 380 computes z1, where z1=x[i]*y[j]+s[j]. The register 394 sends z1 to the MUX 528.

In some embodiments, at the second path, the MUX 512 selects a carrier c based on whether the present inner loop iteration is the first inner loop iteration of the inner loop 204 at the PE 306-k, where j=(k−1)u+1. If j=(k−1)u+1, then the MUX 512 selects the carrier c received at the input 334. Otherwise, the MUX 512 selects a carrier c provided to the MUX 512 from the register 394. The MUX 512 provides the selected carrier c to the register 392 of the MAC 380. The MUX 514 selects q[i] and sends q[i] to the register 386 of the MAC 380. The RAM 520 provides m[j] to the register 388. The MUX 528 selects z1 and provides z1 to the adder 384. The MAC 380 computes z2, where z2=z1+q[i]*m[j]+c.

In some embodiments, at the third path, the register 394 may provide z2 to the shift 502 and MUX 512. The higher w2 bits of z2 are provided to the MUX 512 as the carry c for the next inner loop iteration processing y[j+1] and m[j+1]. In some examples, it is determined that the present inner loop iteration is not the first inner loop iteration of the inner loop 204 (e.g., j is not equal to (k−1)u+1). In those examples, the lower $w1^{th}$ bits of z2 are provided to the shift 502 and then to the RAM 504, which is saved together with the remainder r computed during the last inner loop iteration (e.g., retrieved from the RAM 504) as s[j−1]. The $w1^{th}$ to $w2^{th}$ bits of z2 is also provided to the RAM 504 through shift 502, which are saved as the remainder r in the RAM 504 and may be used in the next inner loop iteration processing y[j+1] and m[j+1].

In some examples, it is determined that the present inner loop iteration is the first inner loop iteration of the inner loop 204 at the PE 306-k, where j=(k−1)u+1. In those examples, the register 394 provides z2 to the register 530. The register 530 also receives the remainder r from the input 336. The value s[(k−1)u] is computed using the lower w1 bits of z2 and the remainder r received from the input 336, and is provided to the output 346, which is then sent to the preceding PE (e.g., PE 306-(k−1)). The value s[(k−1)u] may then be sent to the preceding PE for the next outer loop iteration.

In some examples, it is determined that the present inner loop iteration is the last inner loop iteration of the inner loop 204 at the PE 306-k, where j=ku. In those examples, the register 394 provides z2 to the register 530. The highest w2 bits of z2 may be provided as the carrier c at the output 342, which is sent to the next PE (e.g., to the PE 306-(k+1)). The w1$^{th}$ to w2$^{th}$ bits of z2 may be provided as the remainder r at the output 344, which is sent to the next PE (e.g., to the PE 306-(k+1)).

As illustrated in FIGS. 2, 3A, 3B, 4, and 5, in various embodiments, the operand X, the operand Y, and the modulus M are partitioned into words of word widths w1 and w2 according to the precision of multipliers used in the PEs. For example, for N1-bit by N2-bit multipliers, w1 is selected to be N1 and w2 is selected to be N2, where N1<N2. The algorithm 200 loops $L_x*L_y$ times, where $L_x/L_y=N2/N1$ where X and Y have the same width. Compared to an implementation for performing Montgomery multiplication where both w1 and w2 are selected to be N1 and $L_x*L_x$ loops are required, a latency saving of N2/N1 is achieved. For example, for a Montgomery computation device 300 using 17-bit by 26-bit multipliers, the operand X is processed as $L_x$ words each having a word width of 17 bits, and each of the operand Y and the modulus M is processed as $L_y$ words each having a word width of 26 bits. As such, the Montgomery computation device 300 implementing the algorithm 200 may be 1.53 (26/17) times faster than a process that performs Montgomery multiplication where both w1 and w2 are selected to be 17 bits.

Furthermore, as illustrated in FIGS. 3A, 3B, 4, and 5, in various embodiments, by using registered MACs 380, the latency of the device 300 may be reduced by increasing the clock frequency. Moreover, by packing the calculation of u words of the operand Y in a single PE 306 in a pipelined manner, idle clock cycles are reduced and higher speed is achieved. Additionally, reduction in resource consumption is achieved by reducing the number of the PE 306 required by device 300.

Figure 6:
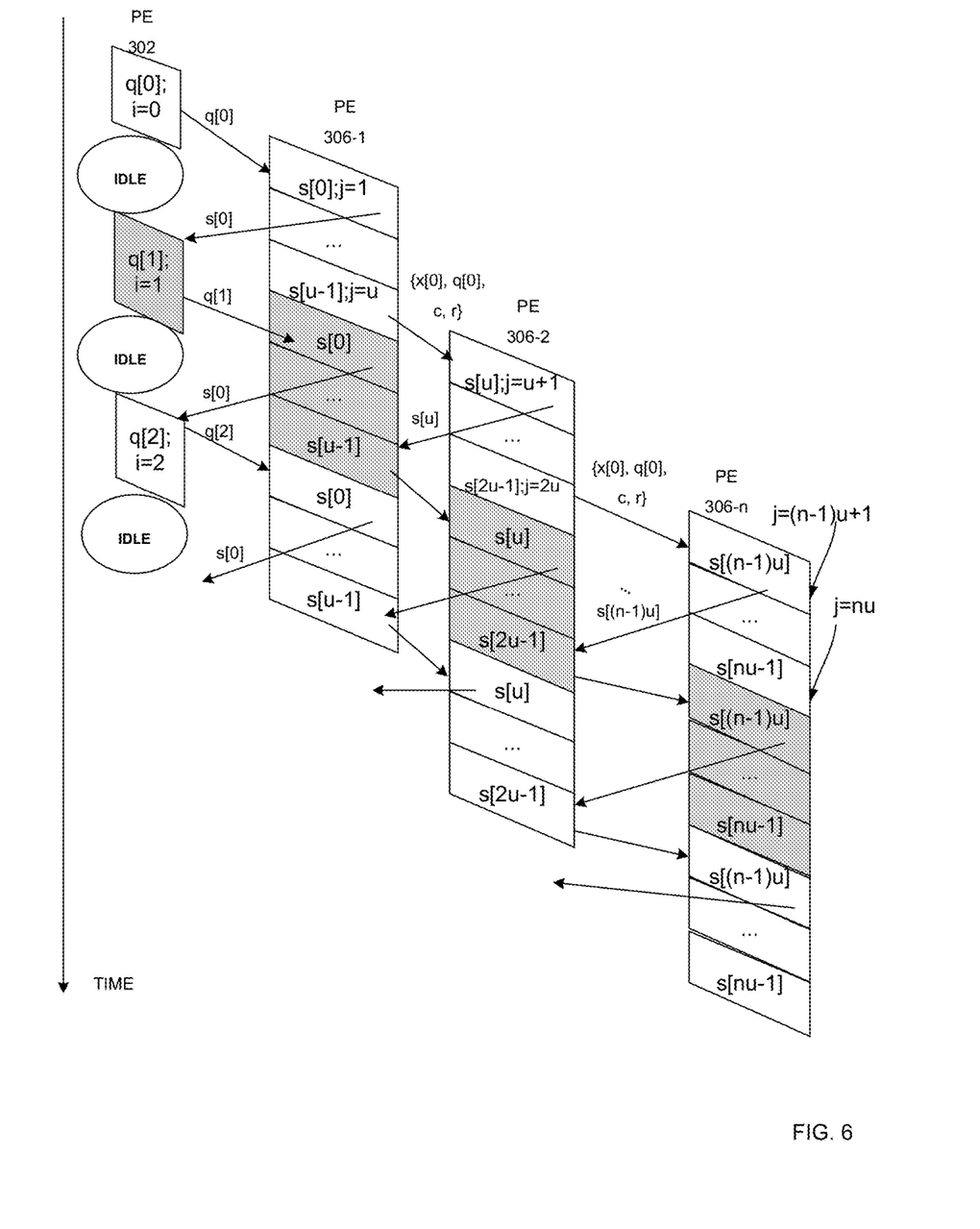
FIG. 6 is a timing diagram of an exemplary Montgomery multiplication device or a portion thereof according to some embodiments of the present disclosure.

Referring to FIG. 6, illustrated is an exemplary high level timing diagram of a device 300 implementing the algorithm 200. As illustrated in the example of FIG. 6, during the first outer loop iteration processing x[0], the PE 302 provides q[0] to the PE 306-1. The PE 306-1 performs u inner loop iterations to iterate through the u words of the operand Y. The PE 306-1 computes s[0] during the first inner loop iteration processing y[1] and m[1], and provides s[0] to the PE 302 which is used in the next outer loop iteration processing x[1]. The PE 306-1 then computes s[1], s[2], s[u−1] without any idle clock cycles. During the inner loop iteration processing y[u] and m[u], the PE 306-1 provides x[0], q[0], c, and r to the PE 306-2. Similarly, the PE 306-2 and the PE 206-n compute the value of s[j] without having any idle clock cycles.

Referring to FIG. 7, illustrated is an exemplary detailed timing diagram of a device 300 implementing the algorithm 200. In the illustrated example, each of the multiplier 382 of the PE 302, PE 306-1, and PE 306-2 is an N1-bit by N2-bit multiplier, where N1 is 17, and N2 is 26. Each of the PE 306-1 and the PE 306-2 uses a pipelined architecture to process the u words of the Y operand, where u=6. As shown by the columns corresponding to the multiplier 382 and the adder 384 of each of the PE 306-1 and PE 306-2, both the multiplier 382 and the adder 384 are fully utilized without any idle clock cycles.

In some examples, the multiplier 382 of the PE 306 is fully utilized without any idle clock cycles between the inner loop iterations for y[j] and y[j+1]. In an example, in the PE 306-1, after the multiplier 382 performs an operation of the inner loop iteration for y[1] (e.g., computing p2) at clock cycle 10, the multiplier 382 performs an operation of the next inner loop iteration for y[2] (e.g., compute p1) at clock cycle 11.

In some examples, the multiplier 382 of the PE 306 is fully utilized without any idle clock cycles between the last inner loop iteration (e.g., for y[6]) for the i$^{th}$ outer loop iteration and the first inner loop iteration (e.g., for y[1]) for the (i+1)$^{th}$ outer loop iteration. For example, in the PE 306-1, the multiplier 382 performs an operation of the last inner loop iteration (e.g., computing p2 for y[6]) of an outer loop iteration processing x[i] at clock cycle 20. The multiplier 382 may then perform an operation of the first inner loop iteration (e.g., computing p1 for y[1]) of the next outer loop iteration processing x[i+1] at clock cycle 21.

In some embodiments, during the same clock cycle, the multiplier 382 and the adder 384 of the same MAC 380 of a PE 306 may perform operations for different inner loop iterations (e.g., different y words) and/or different outer loop iterations (e.g., different x words). For example, during clock cycle 21, the adder 384 of the PE 306-1 performs an operation of an inner loop iteration processing y[6] (e.g., performing the addition in line 3.6.2 of the algorithm 200, where j=6). During the same clock cycle 21, the multiplier 382 of the PE 306-1 performs an operation of a different inner loop iteration (e.g., processing y[1]) and a different outer loop iteration (e.g., processing x[i+1]) by performing the multiplication in line 3.6.1 of the algorithm 200, where j=1.

Figure 8:
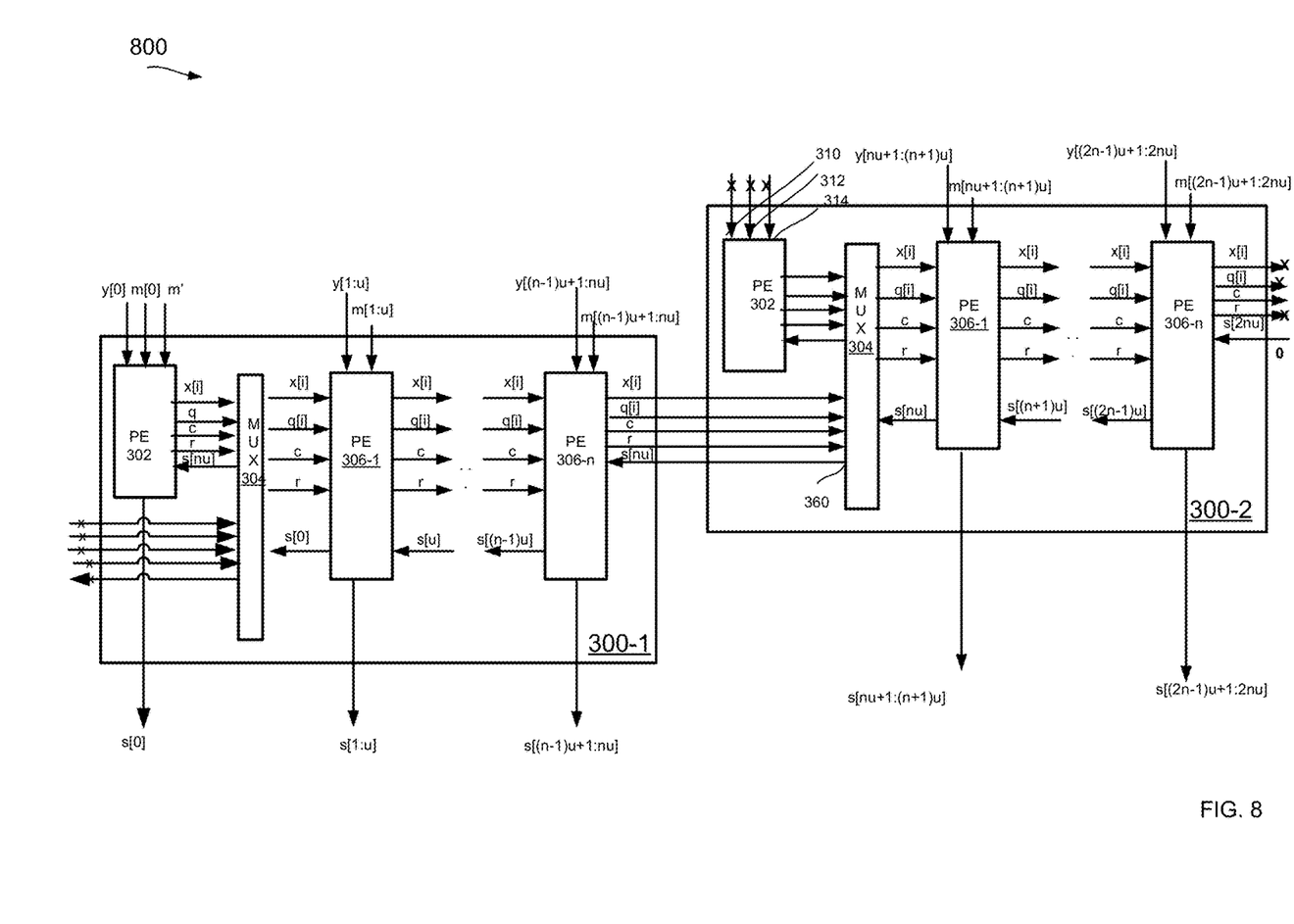
FIG. 8 is a block diagram illustrating an exemplary Montgomery multiplication device formed by cascading two Montgomery multiplication units according to some embodiments of the present disclosure.

Referring to FIG. 8, in some embodiments, to support large operands, two or more Montgomery multiplication devices 300 are cascaded. In the example illustrated in FIG. 8, Montgomery multiplication devices 300-1 and 300-2 are configured in a cascaded mode (e.g. by a configuration bitstream from a memory), and form a combined Montgomery multiplication device 800. Each of the devices 300-1 and 300-2 includes a PE 302 and n PE 306, and supports an operand Y having a width of w2*n*u. For example, where w2 is 26, n is 10, and u is 8, each of the devices 300-1 and 300-2 supports an operand Y having a width of 2106 bits. By cascading the device 300-2 to the device 300-1, a Montgomery multiplication device 800 is formed, which uses the PE 302 of the device 300-1 as its first PE receiving y[0], m[0], m' and the words of X. The Montgomery multiplication device 800 may also include a chain of 2n PE 306. As such, the Montgomery multiplication device 800 may support an operand Y having a width of w2*2*n*u bits. For example, where w2 is 26, n is 10, and u is 8, the Montgomery multiplication device 800 may support an operand Y having a width of 4160 bits.

As illustrated in the example of FIG. 8, in the cascaded mode, the device 300-1 receives y[0:nu] of the operand Y and m[0:nu] of the modulus M, and the device 300-2 receives y[nu+1:2nu] of the operand Y and m[nu+1:2nu] of the modulus M. The MUX 304 of the second MMU 300-2 is used to provide the values received from the device 300-1 to the device 300-2, and to provide the value computed in the device 300-2 to the device 300-1. For example, the last PE (e.g., PE 306-n) of the device 300-1 provides intermediate results (e.g., using outputs 338, 340, 342, and 344 to provide x[i], q[i], c, and r) to the MUX 304 of the device 300-2. The MUX 304 selects the intermediate results received from the device 300-1, and provides the received intermediate results to the first PE 306 (e.g., PE 306-1) of the device 300-2. For further example, in the device 300-2, the PE 306-1 sends s[nu] to the MUX 304. The output 360 of the MUX 304 then sends the received s[nu] to the device 300-1 (e.g., to an input of the PE 306-n of the device 300-1). In the cascade mode, the inputs 310, 312, and 314 of the PE 302 of the device 300-2 may not be connected to any external elements.

In some embodiments, the cascaded devices may have identical or substantially the same structure. For example, the cascaded devices may have the same u and n. In some embodiments, the cascaded devices may have different values for u and/or n. For example, a first device 300-1 may have n1 PE 306, each receiving u1 words of the operand Y. For further example, a second device 300-2 may have n2 PE 306, each receiving u2 words of the operand Y. In various embodiments, u1 and u2 may be different, and/or n1 and n2 may be different. In such examples, the combined device 800 may support an operand Y having a width of w2*(u1*n1+u2*n2) bits. While the examples of FIG. 8 are directed at cascading two Montgomery multiplication device, it will be understood by those skilled in that art that any number of Montgomery multiplication devices may be cascaded to support large integers.

It is noted that various configurations (e.g., M, N1, N2, w1, w2, R1, R2, $L_x$, $L_y$, u, n) illustrated in FIGS. 2-8 are exemplary only and not intended to be limiting beyond what is specifically recited in the claims that follow. It will be understood by those skilled in that art that other configurations may be used.

Various advantages may be present in various applications of the present disclosure. No particular advantage is required for all embodiments, and different embodiments may offer different advantages. One of the advantages in some embodiments is that by partitioning the operands into words of different word widths according to the multipliers, the full computing capacity of the multipliers are utilized. Another advantage in some embodiments is that by using registered MACs, the latency is reduced by increasing the clock frequency of the Montgomery multiplication device. Moreover, by packing the calculation of multiple words of an operand in a single processing element in a pipelined manner, idle clock cycles are reduced. Additionally, less processing elements are required where multiple words of an operand are processed in one processing element, which leads to reduction in resource consumption. Yet another advantage in some embodiments is that by cascading two or more Montgomery multiplication devices to form a combined Montgomery multiplication device, larger integers may be supported.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A method, comprising:
    receiving, by an integrated circuit (IC), a multiplicand number, a multiplier number, and a modulus at one or more data inputs, wherein the IC includes a plurality of processing elements (PEs), and wherein each PE includes only one multiplier, only one adder, and a registered multiplier-accumulator circuit (MAC) including the multiplier, the adder, and a first register configured to receive a product from the multiplier and send the product to a first input of the adder;
    partitioning, the multiplicand number into a plurality of multiplicand words, wherein each multiplicand word has a multiplicand word width;
    partitioning the multiplier number into a plurality of multiplier words, wherein each multiplier word has a multiplier word width different from the multiplicand word width;
    performing, using a quotient PE of the plurality of PEs, a plurality of outer loop iterations of an outer loop to iterate through the plurality of the multiplicand words, wherein the performing each outer loop iteration of the outer loop includes:
        performing, using a plurality of tailing PEs of the plurality of PEs, a plurality of inner loop iterations of an inner loop to iterate through the plurality of the multiplier words, wherein during each inner loop iteration performing, by the registered MAC of a tailing PE, a multiply-accumulate operation associated with a multiplier word corresponding to the inner loop iteration; and
    determining a Montgomery product of the multiplicand number and the multiplier number with respect to the modulus.

2. The method of claim 1, further comprising:
    partitioning the modulus into a plurality of modulus words, wherein each modulus word has the multiplier word width;
    wherein the performing the plurality of inner loop iterations of the inner loop includes:
        iterating through the plurality of modulus words.

3. The method of claim 1,
    wherein the multiplier of the registered MAC is an N1 bit by N2 bit multiplier, wherein N1 and N2 are different integers; and
    determining the multiplicand word width and the multiplier word width based on N1 and N2.

4. The method of claim 3, wherein the determining the multiplicand word width and the multiplier word width based on N1 and N2 includes:
    providing N1 as the multiplicand word width; and
    providing N2 as the multiplier word width;
    wherein N1 is less than N2.

5. The method of claim 3, comprising:
    computing a quotient using a divisor $2^{N1}$ and a dividend generated based on a multiplier word and a multiplicand word for each outer loop iteration of the outer loop using the quotient PE; and
    providing the quotient to a first tailing PE.

6. The method of claim 5, further comprising:
    dividing the plurality of multiplier words into a plurality of multiplier word groups, wherein each multiplier word group includes a same number of multiplier words; and
    providing a multiplier word group to each tailing PE.

7. The method of claim 6, wherein the performing the inner loop iterations of the inner loop using the plurality of tailing PEs includes:
    performing, by each tailing PE, a portion of the inner loop iterations to iterate through the multiplier words of the provided multiplier word group.

8. The method of claim 6, further comprising:
    performing, by the multiplier of the registered MAC of a tailing PE, a first multiplication operation of a first inner loop iteration of a first inner loop during a first clock cycle; and
    performing, by the multiplier of the registered MAC of the tailing PE, a second multiplication operation of a second inner loop iteration of the first inner loop during a second clock cycle next to the first clock cycle.

9. The method of claim 6, further comprising:
performing, by the multiplier of the registered MAC of a tailing PE, a first multiplication operation of a first inner loop iteration of a first inner loop during a first clock cycle; and
performing, by the multiplier of the registered MAC of the tailing PE, a second multiplication operation of a second inner loop iteration of a second inner loop during a second clock cycle next to the first clock cycle.

10. An integrated circuit (IC), comprising:
one or more inputs configured to receive a multiplicand number, a multiplier number, and a modulus;
a Montgomery multiplication circuit configured to generate a Montgomery product of the multiplicand number and the multiplier number with respect to the modulus, wherein the Montgomery multiplication circuit includes:
 a partition circuit configured to:
  partition the multiplicand number into a plurality of multiplicand words, each multiplicand word having a multiplicand word width;
  partition the multiplier number into an initial multiplier word and plurality of remaining multiplier words, each multiplier word having a multiplier word width different from the multiplicand word width;
 a plurality of processing element (PE) circuits including a quotient PE circuit and a plurality of tailing PE circuits, each PE circuit including only one adder, and a registered multiplier-accumulator circuit (MAC) including a multiplier, the adder, and a first register configured to receive a product from the multiplier and send the product to a first input of the adder;
 wherein the quotient circuit is configured to:
  receive the plurality of the multiplicand words and the initial multiplier word;
  iterate through the plurality of the multiplicand words in a plurality of outer loop iterations respectively; and
  for each outer loop iteration, compute a quotient using a divisor $2^{N1}$ and a dividend generated using the initial multiplier word and a multiplicand word corresponding to the outer loop iteration; and
 wherein the plurality of tailing PE circuits are connected in sequence and configured to:
  receive the quotient from the quotient PE circuit and the plurality of remaining multiplier words, and
  for each outer loop iteration, iterate through the plurality of remaining multiplier words in a plurality of inner loop iterations respectively.

11. The IC of claim 10, wherein the partition circuit is further configured to partition the modulus into an initial modulus word and a plurality of remaining modulus words, wherein each modulus word has the multiplier word width,
wherein the quotient PE circuit is configured to compute the quotient using the initial modulus word for each outer loop iteration, and
wherein the plurality of tailing PE circuits are configured to iterate through the plurality of remaining modulus words in the plurality of inner loop iterations.

12. The IC of claim 10, wherein the multiplier of the registered MAC is an N1 bit by N2 bit multiplier,
wherein N1 and N2 are different integers,
wherein the multiplicand word width is equal to N1, and
wherein the multiplier word width is equal to N2.

13. The IC of claim 12, wherein N1 is less than N2.

14. The IC of claim 12, wherein the multiplier of the registered MAC of the quotient PE circuit is configured to:
for each outer loop iteration, perform a multiplication of the initial multiplier word and the multiplicand word corresponding to the outer loop iteration.

15. The IC of claim 10, wherein the Montgomery multiplication circuit is configured to:
divide the plurality of remaining modulus words into a plurality of modulus word groups, wherein each modulus word group includes a same number of modulus words; and
provide a first modulus word group of the plurality of modulus word groups to a first tailing PE circuit.

16. The IC of claim 10, wherein the Montgomery multiplication circuit is configured to:
divide the plurality of remaining multiplier words into a plurality of multiplier word groups, wherein each multiplier word group includes a same number of multiplier words; and
provide a first multiplier word group of the plurality of multiplier word groups to a first tailing PE circuit.

17. The IC of claim 16, wherein the first tailing PE circuit is configured to:
perform a portion of the inner loop iterations by iterating through the multiplier words of the first multiplier word group.

18. The IC of claim 16, wherein the multiplier of the first tailing PE circuit is configured to:
perform a first multiplication operation of a first inner loop iteration of a first inner loop during a first clock cycle; and
perform a second multiplication operation of a second inner loop iteration of the first inner loop during a second clock cycle next to the first clock cycle.

19. The IC of claim 16, wherein the multiplier of the first tailing PE circuit is configured to:
perform a first multiplication operation of a first inner loop iteration of a first inner loop during a first clock cycle; and
perform a second multiplication operation of a second inner loop iteration of a second inner loop during a second clock cycle next to the first clock cycle.

20. The IC of claim 10, wherein the registered MAC includes:
a second register coupled to a first input of the multiplier;
a third register coupled to a second input of the multiplier;
a fourth register coupled to a second input of the adder; and
a fifth register coupled to an output of the adder.

* * * * *